United States Patent [19]

McCafferty

[11] 4,047,655
[45] Sept. 13, 1977

[54] LIQUID LEVEL CONTROL MEANS AND METHOD

[75] Inventor: Gerald P. McCafferty, Churchville, Pa.

[73] Assignee: The Budd Company, Troy, Mich.

[21] Appl. No.: 636,285

[22] Filed: Nov. 28, 1975

[51] Int. Cl.² ............................................. B23K 3/06
[52] U.S. Cl. .................................... 228/259; 228/36; 137/209; 137/386; 137/453
[58] Field of Search .............. 228/36, 39, 40, 259; 118/421; 137/403, 406, 426, 453; 137/209, 386

[56] References Cited

U.S. PATENT DOCUMENTS

| | | | |
|---|---|---|---|
| 2,344,589 | 3/1944 | Bogner | 228/33 |
| 2,619,063 | 11/1952 | Anderson | 228/37 |
| 2,771,049 | 11/1956 | Fish | 228/33 |
| 3,147,765 | 9/1964 | Jones | 137/406 |
| 3,172,781 | 3/1965 | Grill | 228/36 X |
| 3,344,804 | 10/1967 | Lyman | 137/453 X |

*Primary Examiner*—Al Lawrence Smith
*Assistant Examiner*—K. J. Ramsey

[57] ABSTRACT

A pressured gas in a control chamber is used to repetitively change the levels of liquid in a container up and down between two levels and holding at the two levels for predetermined time intervals to permit a function, such as a plurality of soldering operations, to be accomplished.

3 Claims, 3 Drawing Figures

LIQUID LEVEL CONTROL MEANS AND METHOD

Liquid level gages for determining and controlling various levels of liquid in a container are well known. Also known are soldering arrangements wherein the levels of the solder bath are moved up and down to meet a workpiece to be soldered. One such latter arrangement is illustrated in a U.S. Pat. No. 3,684,151.

Many soldering operations used heretofore, for example, used in soldering radiator cores, have involved dipping. In these operations, a radiator core is clamped in a hydraulically powered manipulator and lowered by manual control into the solder bath, held for a period of time at the operator's discretion and then removed. This practice has resulted in variable quality solder joints because of the variable timing involved. When using the higher lead solder alloys, the timing of the soldering operations becomes especially critical. Many such previous soldering systems require constant replenishment of the solder as it is removed from the solder bath as a result of the soldering operations.

While the invention to be described herein will be described in connection with a soldering arrangement for sequentially soldering one at a time a plurality of workpieces, its application may relate to other liquid level control systems wherein liquid levels are repetitively changed between two predetermined levels and maintained at these levels for predetermined time intervals.

It is an object of this invention to provide a novel liquid level control system.

It is an object of this invention to provide an improved soldering system wherein the level of the soldering bath and timing of the soldering operation are accurately controlled.

It is still a further object of this invention to provide an improved soldering system wherein the soldering level is maintained at a predetermined level despite use of some of the solder in the solder bath.

It is a further object of this invention to provide means for an automatic cycling operation to control the level of a soldering bath and timing of a plurality of sequential soldering operations.

In accordance with the present invention, methods and means are provided for automatically and cyclically changing a liquid between two different levels in a container. First and second chambers including open ends are disposed in the liquid. Pressure is applied to the first chamber to increase the pressure therein and cause the level of the liquid to lower therein. This causes the liquid level in the container to rise. At the same time, the liquid level within the second chamber also rises increasing the pressure therein. When the pressure within said second chamber rises above a predetermined level, it is detected to discontinue the application of additional pressure to the first chamber thereby maintaining the pressure therein at a fixed level. The liquid level in the container is also held at a fixed level for a predetermined time interval. After the predetermined time interval, the pressure within the first chamber is released and the liquid level therein rises causing the liquid levels in the second chamber and container to be lowered. The cycle is then repeated with pressure again being applied to the first chamber.

Other features of the invention will be apparent from the following detailed description and accompanying drawings in which.

Figure 1:
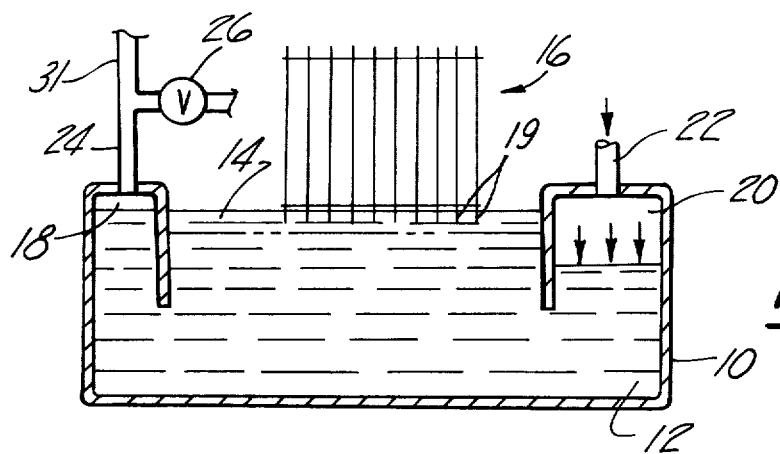
FIG. 1 is a schematic showing of an embodiment of the invention in use.
Figure 2:
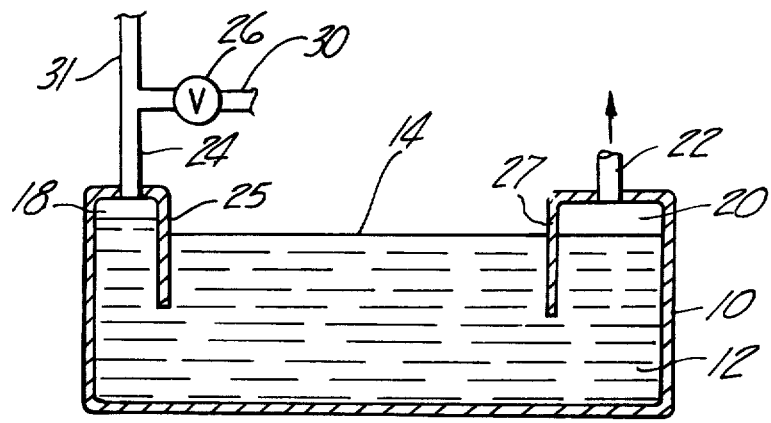
FIG. 2 is illustrative of an initial set up of the embodiment of FIG. 1.

Referring particularly to FIG. 1, a container 10 includes a solder bath 12 with its operating level 14 being set to perform a soldering operation on a plurality of segments 19 of a core structure 16. The core structure 16 may be for a radiator for an automobile, for example. During operation, a plurality of core structures (not illustrated) is sequentially placed in position one at a time a predetermined distance over the solder bath when the solder bath in the container is in a lower level, as illustrated in FIG. 2. After each core structure 16 is positioned, the level of the solder 14 is raised to the level illustrated in FIG. 1 to perform the soldering operation and then lowered between soldering operations to the level illustrated in FIG. 2.

Referring particularly to FIG. 2, the set-up of the soldering apparatus prior to performing soldering operations is illustrated. The container 10 includes a pair of chambers 18 and 20. The chambers 18 and 20 may be formed by separate containers having open ends disposed within the solder bath 12 or by any other suitable arrangement. In the embodiment illustrated, a pair of wall members 24 and 27 are integral with the container and extend into the solder bath 12 to form the chambers with the outer wall of the container.

In setting up the original operating level 14 illustrated in FIG. 1, preliminary steps must be taken. The first chamber 20 may be pressurized manually or by any convenient means by applying pressure through an inlet 22. At the same time, the second chamber 18 is vented to the atmosphere through outlet 24 and a valve 26. The valve 26 is adapted to open or close the outlet 24 to the atmosphere. The outlet 31, for purposes of describing FIGS. 1 and 2, is considered to be closed and will be discussed in connection with FIG. 3.

When pressure is applied to the chamber 20, the solder level therein is lowered. At the same time, the solder levels outside of the chamber 20 within the container 10 and within the chamber 18 are raised. When the solder bath level is at the desired height within the container 10, the chamber 18 and the outlet 24 are shut off from the atmosphere by the valve 26, which is closed.

After the initial set-up for the operating solder level 14 (FIG. 1) has been set, pressure is released from the chamber 20 by a valve or other means (illustrated by valve control means 28 in FIG. 3) thereby permitting the solder level therein to be lowered to the level illustrated in FIG. 2. This creates a negative pressure within the chamber 20. The solder level within the container 10 is also correspondingly lowered.

The solder level within the chamber 18 is also lowered lowering the pressure therein. The pressure within the chamber 18 goes negative when the valve 26 is closed with the solder level lowered. This condition is illustrated in FIG. 2. The conditions are now set for automatic soldering operations.

In practicing the present invention, the levels of the solder bath are switched automatically and repetitively from the lower level illustrated in FIG. 2 to the higher level illustrated in FIG. 1, with the higher levels being maintained for predetermined time intervals during the soldering or other operations.

Figure 3:
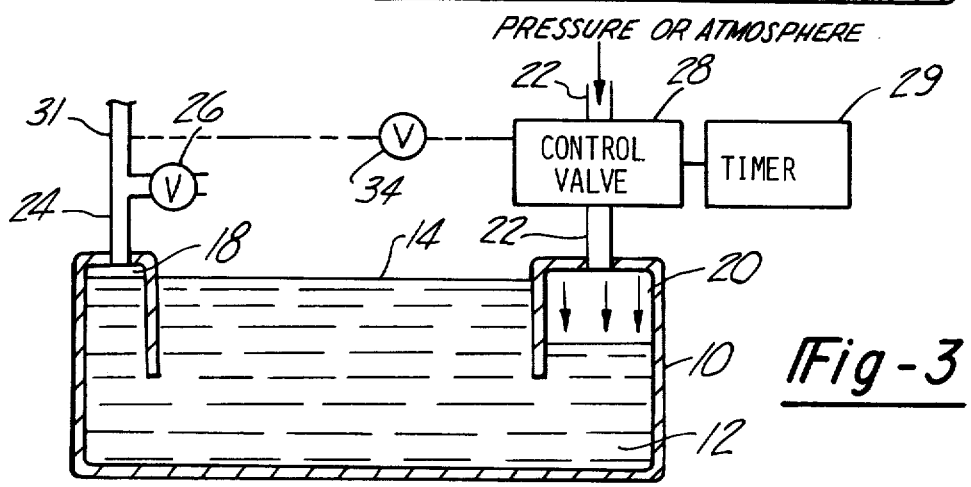
FIG. 3 is a schematic of liquid level control means according to the invention.

Referring particularly to FIG. 3, with a radiator 16 to be soldered in place over the solder bath 12, pressure is applied to the chamber 20 through a control valve 28, to lower to solder level therein. At the same time, the solder level within the chamber 18 is raised and the solder operating level in the container 10 is raised to the operating level, which is that illustrated in FIG. 1.

When the solder level within the chamber 18 rises, the pressure therein returns from a negative pressure to zero. This lowered pressure is detected and then used to control the operation of a feedback valve 34. The feedback valve in turn controls the inlet valve 28. The valves 34 and 28 are conventional and, therefore, not described in great detail. For example, the valve 34 may include a pressure-responsive diaphragm to actuate a spool. Actuation of the spool may then be used to control the operation of fluid pressure which in turn may be used to operate the valve 28 to either a source of pressure or permit venting to the atmosphere or to close it.

When the valve 34 operates to close the valve 28, input pressure to the chamber 20 will be discontinued. Conditions illustrated in FIG. 3 will be maintained for a predetermined time period as determined by the setting of a timer 29. At the end of a predetermined time, the timer 29 operates to open the valve 28 thereby permitting the pressure of chamber 20 to exhaust into the atmosphere. The various levels of the solder bath will then return to the levels illustrated in FIG. 2.

It is noted that the operating level of the solder is dependent upon the pressure within the chamber 18. The level of the solder must be such so as to reduce the negative pressure within the chamber 18 to zero or some other predetermined pressure indicative of the operating level desired. Even when solder is removed from the container as a result of the soldering operations, the solder will rise to the desired operating level.

What is claimed is:

1. Apparatus for switching automatically and repetitively the level of a liquid in a container from a first lower level to a second higher level comprising:
   a pair of means disposed in said liquid within said container to provide first and second chambers,
   valve means for applying or releasing pressure to said first chamber to cause the liquid level therein to lower and the liquid level in said second chamber and container to rise to said second higher level.
   means including a pressure responsive device for detecting the liquid level within said second chamber,
   means connecting said pressure responsive device to said valve means to discontinue the application of additional pressure to said first chamber while maintaining the pressure therein as long as the liquid level within said container is at said second higher level, and
   timing means to activate said valve means for releasing the pressure within said first chamber after a predetermined time to cause the liquid level therein to rise and the liquid level in said second chamber and said container to lower to said first level.

2. Apparatus for controlling the soldering operation of a plurality or workpieces and for switching automatically and repetitively the level of solder in a container comprising:
   means for holding and sequentially moving one at a time said workpieces over said solder a predetermined distance therefrom,
   a pair of means including open ends disposed in said solder to provide a first and second chambers,
   valve means for applying pressure or releasing pressure into said first chamber to cause the solder level therein to lower and the solder level outside in said second chamber and said container to rise to contact the particular workpiece disposed over said solder,
   means including a pressure responsive device for detecting the solder level and pressure within said second chamber to discontinue the application of additional pressure to said first chamber while maintaining its pressure therein when the solder level therein reaches a predetermined level, and
   timing means to activate said valve means for releasing the pressure within said first chamber after said soldering of said particular workpiece to cause the solder level therein to rise and the solder level in said second chamber to lower and the solder level in said container to lower away from said particular workpiece.

3. A method of soldering plurality of workpieces and for switching automatically and repetitively the level of solder in a container comprising the steps of:
   sequentially positioning one at a time said workpieces over said solder a predetermined distance therefrom;
   placing first control means with an open end into said solder to provide a first enclosed pressure chamber;
   applying pressure to said first chamber to force the solder level therein to lower, the solder level in said second chamber to rise and the solder level in said container to rise to contact said workpiece;
   detecting the solder level within said second chamber to discontinue the application of additional pressure to said first chamber while maintaining its pressure when the solder level therein reaches the level to apply solder to a particular workpiece disposed over said solder;
   maintaining the solder level within said container at its raised level during the soldering of said particular workpiece, and
   releasing the pressure within said first chamber after soldering said workpiece for a predetermined time to cause the solder level therein to rise, the level of the solder in said second chamber to lower and the solder level in said container to lower away from said particular workpiece to discontinue soldering of said particular workpiece.

* * * * *